Patented Jan. 1, 1946

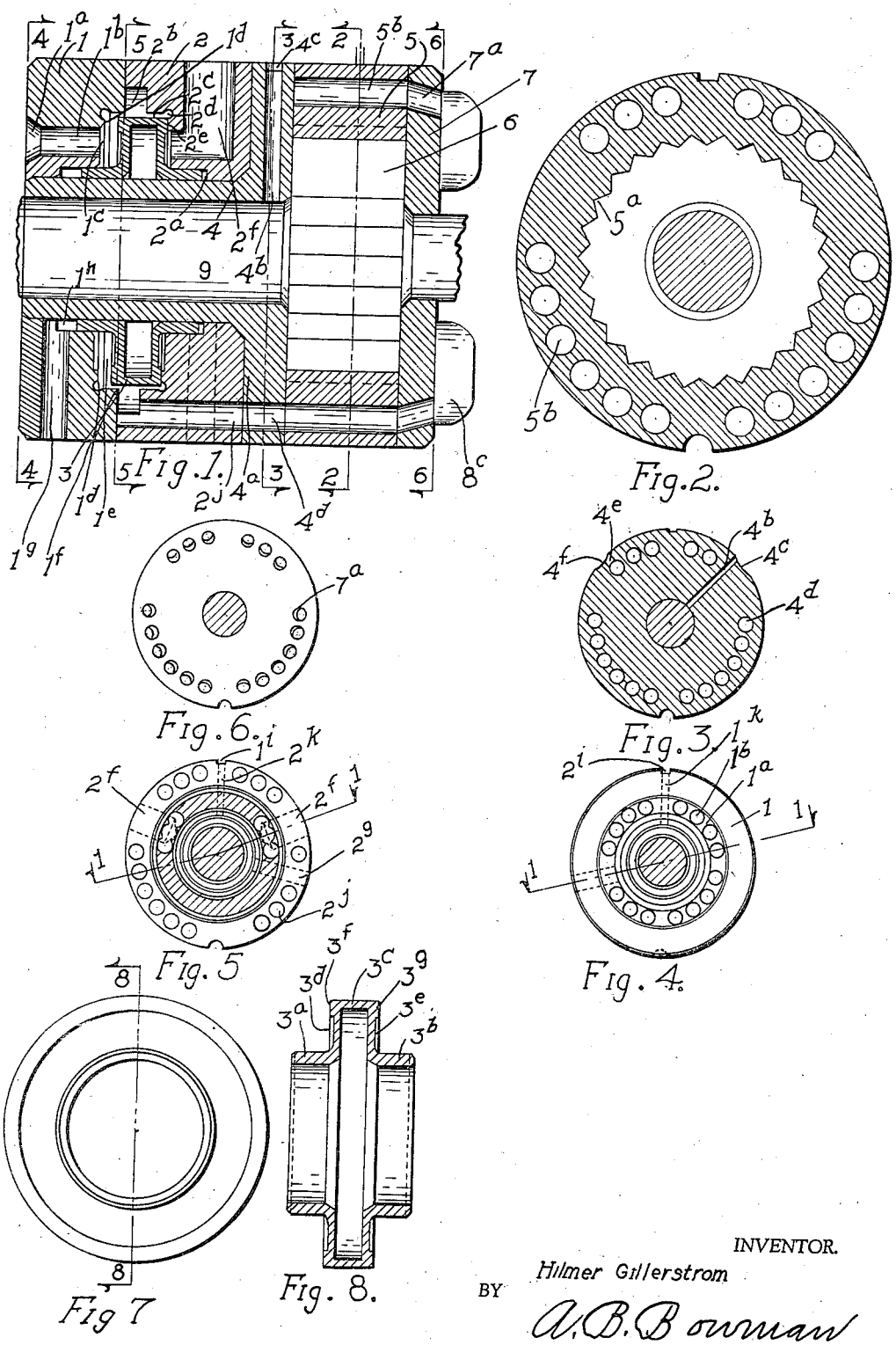

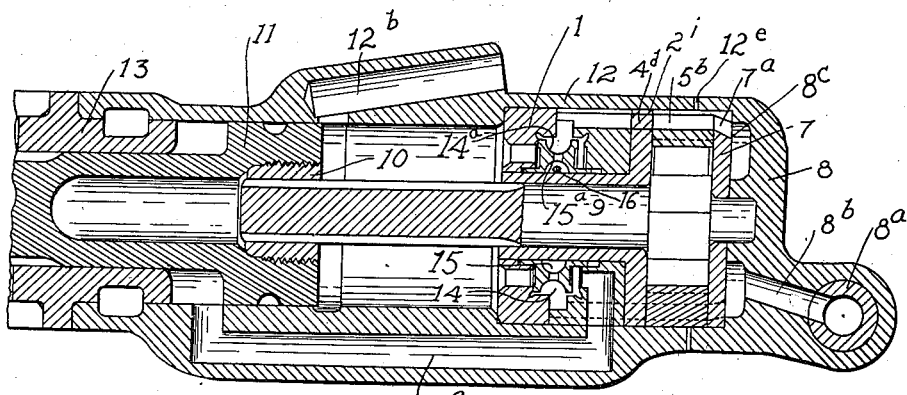

2,392,141

UNITED STATES PATENT OFFICE 2,392,141

CONTROL VALVE MECHANISM FOR PNEUMATIC TOOLS

Hilmer Gillerstrom, South Pasadena, Calif., assignor to Independent Pneumatic Tool Co., Chicago, Ill., a corporation of Delaware Application August 3, 1942, Serial No. 453,318

2 Claims. (Cl. 121—19)

My invention relates to a control valve mechanism for pneumatic tools, more particularly for pneumatic drills of the reciprocating type and the objects of my invention are:

First, to provide an improved and novel pressure fluid motor valve mechanism;

Second, to provide a novel and improved pressure fluid distribution mechanism;

Third, to provide a control valve mechanism for pneumatic tools whereby the flow of pressure fluid to the motor is positively controlled;

Fourth, to provide a valve mechanism of this class that operates effectively regardless of the variation of heat or pressure of the motive fluid;

Fifth, to provide a fluid distributing valve mechanism of this class that is simultaneously both piston controlled and live air controlled; that is by air controlled by movement of the piston and also by live air directly to the tool;

Sixth, to provide an improved valve mechanism of this class with an improved valve throwing means that is novel for an improved valve mechanism of the single valve type;

Seventh, to provide a valve mechanism of this class in which the valve mechanism is so constructed that the valve will move between its seats with a reduction of the metal friction to a minimum; and Eighth, to provide a valve mechanism of this class which is very simple and economical of construction, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a longitudinal sectional view of the main portion of my valve mechanism with the valve shown in its receded or back position taken from the line 1—1 of Fig. 5; Fig. 2 is a transverse sectional view taken from the line 2—2 of Fig. 1; Fig. 3 is a transverse sectional view on a reduced scale taken from the line 3—3 of Fig. 1; Fig. 4 is an end view on a reduced scale taken from the line 4—4 of Fig. 1; Fig. 5 is a sectional view on a reduced scale taken from the line 5—5 of Fig. 1; Fig. 6 is an end view on a reduced scale taken from the line 6—6 of Fig. 1; Fig. 7 is a side elevational view of the valve member in one form; Fig. 8 is a sectional view thereof taken from the line 8—8 of Fig. 7; Fig. 9 is a fragmentary longitudinal sectional view showing a conventional pneumatic drill with my control valve mechanism embodied therein and showing the valve member in a slightly modified form from that of the Figs. 1 to 8 inclusive of the drawings; Fig. 10 is an enlarged fragmentary longitudinal sectional view of the control valve operating mechanism shown in Fig. 9 of the drawings; Fig. 11 is a side elevational view of the valve member in modified form and Fig. 12 is a sectional view taken from the line 12—12 of Fig. 11.

Similar characters of reference refer to similar parts and portions throughout the several views of the drawings:

The front valve chest 1, rear valve chest 2, automatic valve member 3, automatic valve guide 4, ratchet ring 5, rotation pawls 6, back plate 7, backhead 8, rifle bar 9, rifle bar nut 10, piston hammer 11, cylinder 12 and cylinder front bearing 13 constitute the principal parts and portions of my control valve mechanism for pneumatic tools.

The rotation pawls 6, backhead 8, rifle bar 9, rifle bar nut 10, piston hammer 11 and cylinder front bearing 13 are conventional and form no part of my present invention.

Positioned around the conventional rifle bar 9 near the one end of the cylinder 12 and positioned in said cylinder is the front valve chest 1 which is an annular ring-like member provided with a plurality of spaced ports 1b with funnel-shaped front ends 1a which ports 1b communicate at their inner ends with an annular groove 1c which terminates at its outer side with a stop portion or seat 1d which serves as a stop or seat for the valve 3 in its reciprocation, this front valve chest being provided with an annular groove 1e to permit the valve 3 to shift therein, it being noted that the chest member 1 extends past the side of the outer edge of the valve at one end, as shown best in Fig. 1 of the drawings. This chest 1 is also provided with a laterally extending port 1g. The inner side of this front valve chest 1 is provided with a groove 1h which intersects the ports 1g, as shown best in Fig. 1 of the drawings and serves as a port to the base portion of the valve member 3.

The rear valve chest 2 is provided with a similar slot 2a in which the other side of the base of the valve 3 is adapted to reciprocate. It is also provided with an annular recess portion 2b which extends outwardly some distance from the main outwardly extending portion of the valve 3. It is also provided with a reduced recess portion 2c with an enlarged curved portion 2d and terminating with a stop or seat portion 2e against which one side of the valve 3 seats when in the position shown in Fig. 1 of the drawings in its rearmost position. It is also provided with an L-shaped port 2f which communicates with one side of the valve 3 at its one end and extends outwardly to the periphery of the rear valve chest 2.

The valve 3 is provided with opposed annular flanges 3a and 3b which extend into the recesses 1h and 2a and are adapted to reciprocate therein on the guide member 4. This valve 3 is provided with an outwardly extending hollow flange portion 3c positioned centrally of the valve and provided with recess portions 3d and 3e in its opposite sides, extending around the same leaving seating portions 3f and 3g which are adapted to seat against the portions 1d and 2e in the valve chest members 1 and 2, all as shown best in Fig. 1 of the drawings.

It will be noted that the valve chest members 1 and 2 are abutted together and form a valve chest in which the valve 3 is adapted to automatically reciprocate. The valve chest 2, it will be noted is provided with two L-shaped ports 2f in angular spaced relation to each other, as shown by dash lines in Fig. 5 of the drawings and with radiating ports 2g, as shown in Figs. 5 and 10 of the drawings. Each of the members 1 and 2 are also provided with grooves 1i and 2i which extend along the upper edge of the members 1 and 2 and along the outer sides of each, as shown by solid and dash lines in Figs. 4 and 5 of the drawings.

The valve guide 4 is provided with a central bore arranged to fit on the rifle bar 9, as shown in Figs. 1, 9 and 10 of the drawings. It is provided with an outwardly extending flange portion 4a which is provided with a radiating port 4b, shown best in Figs. 1 and 3 of the drawings which terminates at the periphery with an arcuate recess 4c. It is also provided with a plurality of transverse ports 4d which extend therethrough near the periphery, as shown best in Fig. 3 of the drawings. From one of these ports 4d extends a laterally extending short port 4e which communicates with another arcuate recess 4f in the periphery of the flange 4a.

The ratchet ring 5 is provided with a plurality of ratchet pawl engaging grooves 5a which operate in the conventional manner with the pawls 6 which are also conventional for turning the rifle bar 9. This ratchet ring 5, shown best in Figs. 1 and 2 of the drawings is provided with a plurality of orifices 5b which extend therethrough near the periphery in separated groups, as shown best in Fig. 2 of the drawings which are adapted to communicate with similar orifices 4d in the flange 4a and these orifices 4d are adapted to communicate with a plurality of similar orifices 2j in the rear valve chest 2.

The back plate 7 is provided with a plurality of angularly positioned orifices 7a which are arranged to conform with and communicate with the orifices 5b in the ratchet ring 5. The outer ends of these orifices 7a communicate with an annular groove 8c in the conventional backhead 8.

In the modified form of valve member, as shown in Figs. 9 to 12 inclusive of the drawings, the front valve chest 1, rear valve chest 2 and all the remaining portions of the structure except the valve member is the same as that shown in Figs. 1 to 8 inclusive. The valve member, as shown best in Figs. 11 and 12 of the drawings differs from the valve member shown best in Figs. 7 and 8 of the drawings in that there is provided a central annular groove 14 which is curved at 14a at its inner side and an annular groove 15 on the inner side is provided with a curve 15a at its outer side leaving a curved wall between the curved wall 14a and 15a which are provided with a plurality of orifices 16 to permit some of the air for operating the valve to pass through the wall into the groove 15 and forms a pressure cushion between the interior of the valve and the valve guide, thus providing an air cushion for the bearing surface of the valve in its reciprocation and reducing the wear on the inner bearing surface of the valve and providing said valve with a floating action which increases its response to the motive fluid.

The operation of my control valve mechanism for pneumatic tools is substantially as follows:

Air passes through the throttle valve 8a under control by said valve, then through the port 8b and into the annular channel port 8c, then passes through the angular ports 7a and through the ports 5b, then through the ports 4d, then through the ports 2j into the channel 2b, thence past the valve through the port 1b to the back side of the piston hammer 11 forcing it forwardly. When the piston hammer 11 reaches approximately the forward end of its stroke, the air passes through the same port but passes to the other side of the valve and through the port 12a to the front side of the piston hammer, shown in Fig. 9 of the drawings which causes the piston hammer 11 to move backwardly after the air has exhausted through the exhaust port 12b. The valve 3 is shifted by means of the trip ports 12c and 12d shown best in Fig. 10. Air pressure to the port 12d shown by dash lines in Fig. 10 passes from the forward side of the piston hammer as it recedes backwardly through the port 1g shown by dash lines in Fig. 10, forces the valve backwardly and the other side is vented through to atmosphere through the port 2k, then through the port 2i and to atmosphere through the exit port 12e. The port 12c receives its pressure air from the cylinder back of the piston hammer 11 in its forward movement after the piston hammer has uncovered the end of the port 12c and the fluid passes to the backside of the valve 3 through the port 2g, the front side being vented by means of air passing to atmosphere through the ports 1k, 1i and out to atmosphere through the port 12e.

The operation of the valve under piston control is substantially as follows: The air coming from the throttle 8a passes through the backhead 8 into the air inlet port in the backhead and then through holes 7a in the back plate 7, then through holes 5b in the ratchet ring 5, then through holes 4d in the valve guide 4 and then through holes 2j in the rear valve chest 2 and into the constant air chamber 2b surrounding the valve 3 and then through the annular port between the valve and valve chest, then through the opening 2f in the rear valve chest, then down through the long air port 12a to the front of the piston. This live air pushes the piston back toward the valve chest and as the edge passes over the exhaust slot E, the piston is gradually building up a pressure beginning from a theoretical atmospheric pressure until the air trapped in the rear chamber of the cylinder is strong enough through the several ports 1b to move the valve from the seat 1d to the opposite seat 2e. This takes place when the edge of the piston passes over edge of the exhaust slot E. Thus the unbalancing of pressure in the front or in the back of the piston as it moves over the exhaust slot controls the movement of the valve. In this case the valve only serves to distribute the fluid.

When the piston has moved back, carried by its own momentum, for a time factor, against the oncoming live air through the ports 1b, the valve moves from the seat 1d to the seat 2e, and it has completed its course. The piston is moved forward and as the edge moves over the exhaust slot E, the trapped air in front of the piston is building up a pressure which when strong enough will move the valve from the seat 2e to the seat 1d; this happens when the edge of the piston moves forwardly over the exhaust slot E and the cycle is completed.

The operation under the live air control is substantially as follows: Exactly the same operation takes place as under the piston control because all of the ports shown are the same for either control. However, the following is added under the live air control. While the piston is moving toward the front by the air coming through the several ports 1b, and while the valve is back against the seat 2e, the live air will move down through the trip port 2g and 12c, shown best in Fig. 10, just before the piston reaches the edge of the exhaust slot E and the valve is moved from the seat 2e to the seat 1g. In like manner when the piston moves back and the edge of the piston passes over the trip port 12d shown by dash lines in Fig. 10, the live air will move the valve from the seat 1d to the seat 2e. This takes place before the edge of the piston reaches the edge of the exhaust slot E and the cycle is complete. Thus it will be noted that both piston control and live air control operates simultaneously and augment each other for a more positive action as well as a better fluid consumption control.

Though I have shown and described a particular construction, combination and arrangement of parts and portions and a certain modification thereof, I do not wish to be limited to this particular construction, combination and arrangement nor to the modification, but desire to include in the scope of my invention the construction, combination and arrangement substantially as set forth in the appended claims.

Having thus described my invention, what I claim as new and desire to secure by Letters Patent is:

1. In an apparatus of the class described, a reciprocably mounted valve provided with opposed extended flange portions forming a bearing for said valve provided with a single hollow central box-like extended flange portion, the side walls of said extended hollow flange portion being provided with annular recesses, said extended hollow flange portion being also provided with orifices communicating with the interior of said hollow box-like portion to admit air for cushioning said valve.

2. In an apparatus of the class described, a reciprocably mounted valve provided with opposed extended flange portions forming a bearing for said valve provided with a single hollow central box-like extended flange portion, the side walls of said extended hollow flange portion being provided with annular recesses, said extended hollow flange portion being also provided with orifices communicating with the interior of said hollow box-like portion to admit air for cushioning said valve, said hollow box-like flange portion provided with a curved annular recess centrally thereof.

HILMER GILLERSTROM.